United States Patent
O'Krafka et al.

(10) Patent No.: US 7,315,919 B1
(45) Date of Patent: *Jan. 1, 2008

(54) BANDWIDTH REDUCTION TECHNIQUE IN A SNOOPING-BASED CACHE-COHERENT CLUSTER OF MULTIPROCESSING NODES

(75) Inventors: Brian W. O'Krafka, Austin, TX (US); Michael J. Koster, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 490 days.

This patent is subject to a terminal disclaimer.

(21) Appl. No.: 10/868,053

(22) Filed: Jun. 15, 2004

(51) Int. Cl.
*G06F 12/00* (2006.01)
(52) U.S. Cl. ............... 711/141; 711/146; 711/147
(58) Field of Classification Search ............ None
See application file for complete search history.

(56) References Cited

U.S. PATENT DOCUMENTS

| 6,883,070 | B2 | 4/2005 | Martin et al. |
| 6,981,097 | B2 | 12/2005 | Martin et al. |
| 2002/0133674 | A1 | 9/2002 | Martin et al. |
| 2005/0144395 | A1 | 6/2005 | Martin et al. |
| 2005/0160430 | A1 | 7/2005 | Steely et al. |
| 2005/0198187 | A1 | 9/2005 | Tierney et al. |
| 2005/0240735 | A1 | 10/2005 | Shen et al. |

*Primary Examiner*—Hyung Sough
*Assistant Examiner*—Mardochee Chery
(74) *Attorney, Agent, or Firm*—Osha • Liang LLP (57) ABSTRACT

A cluster of multiprocessing nodes uses snooping-based cache-coherence to maintain consistency among the cache memories of the multiprocessing nodes. One or more of the multiprocessing nodes each maintain a directory table that includes a list of addresses of data last transferred by cache-to-cache transfer transactions. Thus, upon a local cache miss for requested data, a multiprocessing node searches its directory table for an address of the requested data, and if the address is found in the directory table, the multiprocessing node obtains a copy of the requested data from the last destination of the requested data as indicated in the directory table. Thereafter, a message indicating the completion of a cache-to-cache transfer is broadcast to other connected multiprocessing nodes on a "best efforts" basis in which messages are relayed from multiprocessing node to multiprocessing node using low priority status and/or otherwise unused cycles.

15 Claims, 10 Drawing Sheets

| Address | Last Destination | Type |
|---|---|---|
| G | Node 13 | read |
| Z | Node 9 | read |
| P | Node 1 | write |
| B | Node 11 | read |
| R | Node 8 | write |
| M | Node 9 | write |
| A | Node 16 | read |
| F | Node 10 | read |

FIG. 10 ns of the computer
BANDWIDTH REDUCTION TECHNIQUE IN A SNOOPING-BASED CACHE-COHERENT CLUSTER OF MULTIPROCESSING NODES

BACKGROUND OF INVENTION

Figure 1:
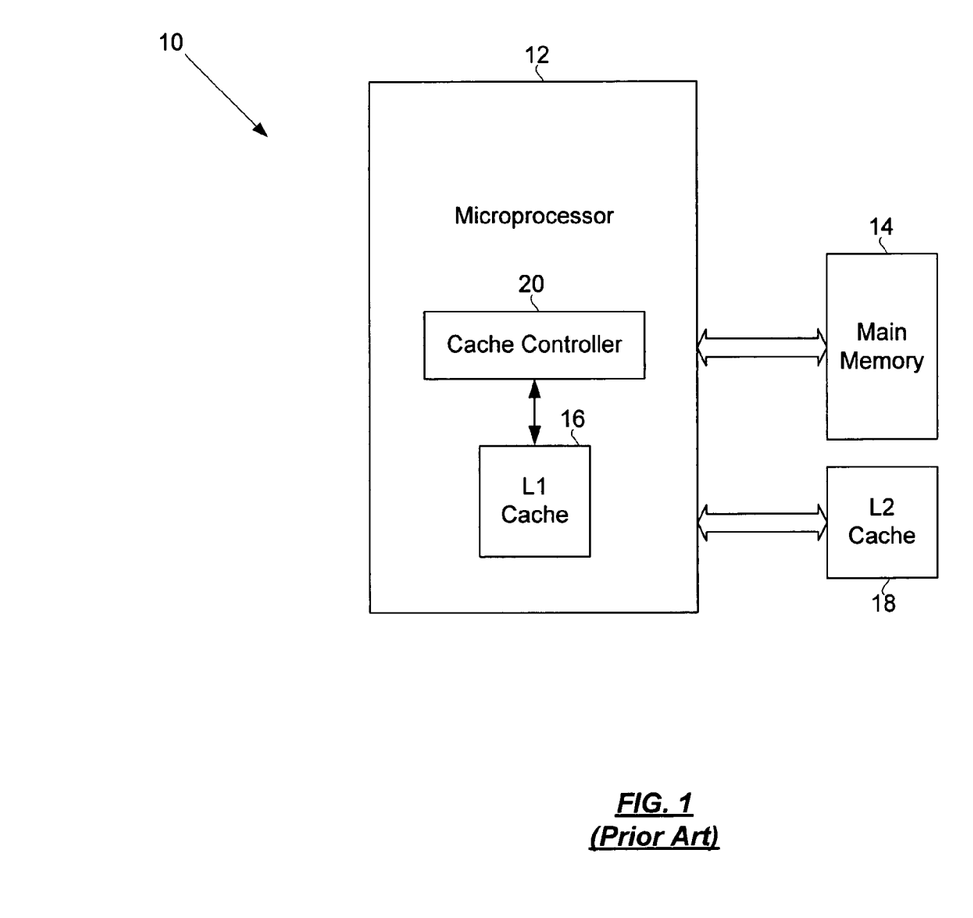
FIG. 1 shows a typical computer system.

As shown in FIG. 1, a typical computer system 10 includes at least a microprocessor 12 and a main memory 14. The main memory 14 contains data for use by the microprocessor 12 to perform the operations of the computer system 10. However, because the speed of the microprocessor 12 is typically significantly faster than that of the main memory 14, memory of smaller size and faster speed (referred to and known as "cache" memory) is often implemented to allow the microprocessor 12 to access frequently and/or recently requested data faster than it would otherwise take to obtain such data from the main memory 14.

Still referring to FIG. 1, the microprocessor 12 has an "on-chip" (i.e., on the same semiconductor die as the microprocessor 12), or "L1," cache memory 16 and an "off-chip," or "L2," cache memory 18. When the microprocessor 12 requests data, a cache controller 20 causes the L1 cache memory 16 to be searched for the requested data, and if that search does not "hit" (i.e., a cache "miss" occurs), the L2 cache memory 18 is searched for the requested data. If the requested data is not found in the cache memories 16, 18, the requested data is retrieved from the relatively slow main memory 14.

Those skilled in the art will recognize that a microprocessor may have any number of cache memory levels, which are typically referred to by number in order of decreasing proximity to the microprocessor. Further, those skilled in the art will recognize that any number of cache memories may be on-chip and any number of cache memories may be off-chip.

Figure 2:
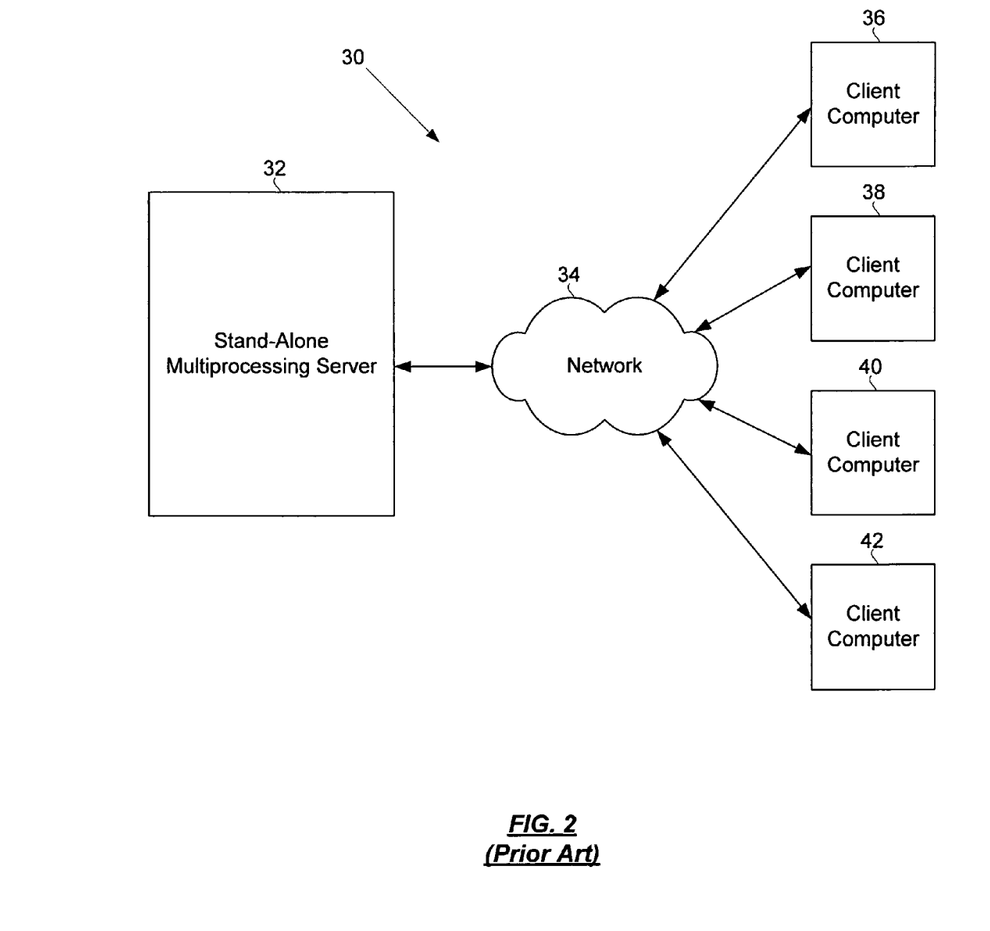
FIG. 2 shows a typical computer network.

A computer system, like the one shown in FIG. 1, may be used as a system that services requests from and provides data to other computers connected over a network. Such a client-server network model 30 is shown in FIG. 2. In FIG. 2, a stand-alone server 32 is connected over a network 34 to several client computers 36, 38, 40, 42. The server 32 may be used to store data, programs, etc. for use by the client computers 36, 38, 40, 42. Those skilled in the art will recognize that the server 32 may also be used to manage and control the client computers 36, 38, 40, 42.

Figure 3:
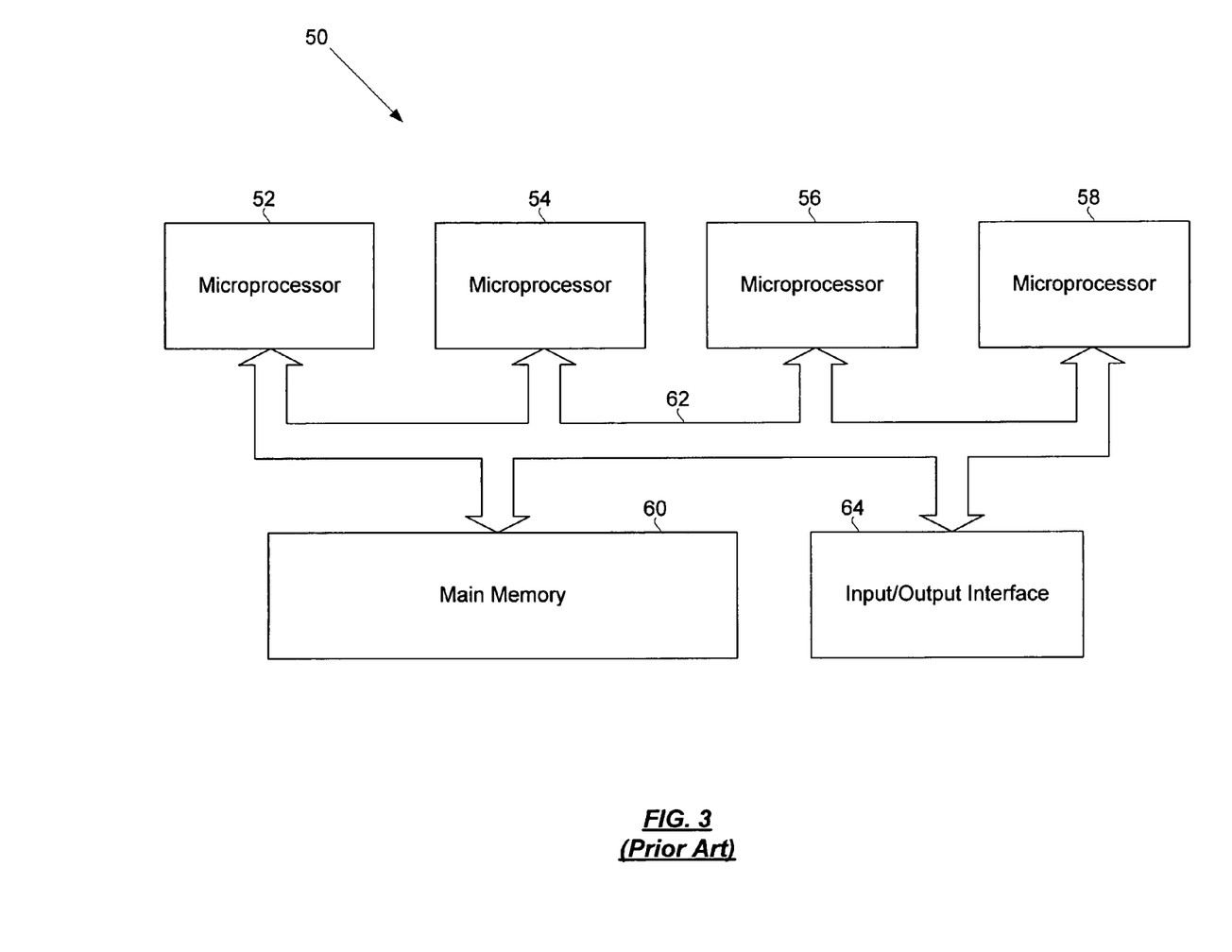
FIG. 3 shows a typical multiprocessor computer system.

Although some computer systems, like the one shown in FIG. 1, have a single microprocessor 12 (such a computer system referred to and known as a "uniprocessor" computer system), other computer systems, like the server 32 shown in FIG. 2, may be formed of multiple microprocessors. FIG. 3 shows such a multiprocessing computer system 50.

The computer system 50 of FIG. 3 is shown as having multiple microprocessors 52, 54, 56, 58. The microprocessors 52, 54, 56, 58 communicate with one another and with a main memory 60 over a network (e.g., a bus) 62. The network 62 is implemented as a set of bits that propagate data in parallel from one location to another. The "bandwidth" of the network 62 (i.e., the number of bits propagated in parallel by the network 62) is an important factor in the overall performance of the computer system 50. FIG. 3 also shows an input/output interface 64 that is connected to the network 62 and serves to input and output data to other portions of the computer system 50 and/or components external to the computer system 50.

Those skilled in the art will recognize that the multiprocessing computer system 50 of FIG. 3 may represent a particular type of multiprocessing computer system used in networking and known and referred to as a symmetric multiprocessing (SMP) computer system. A SMP computer system is one in which multiple microprocessors share, for example, the same memory and input/output interface. Those skilled in the art will also recognize that a SMP computer system may share the same operating system. Although the multiple microprocessors in a SMP computer system share the same resources, each microprocessor may act independently. For example, while one microprocessor searches for data in memory, other microprocessors may update the memory and perform other tasks, thereby increasing the ability of the SMP computer system to handle intensive networking demands.

Those skilled in the art will recognize that SMP computer systems provide good scalability in that additional microprocessors may be added or removed with minimal changes to the system. Despite the benefits of SMP computer systems, bottlenecks may occur when several microprocessors on a board share a single memory bus. Rather than put too many microprocessors on the same SMP board, designers of network elements often distribute applications across a networked cluster of SMP boards, where each board has its own memory, I/O interface, and operating system.

SUMMARY OF INVENTION

According to one aspect of one or more embodiments of the present invention, a computer system comprises: a first processing node having a snooping-based cache-coherence controller, the first processing node arranged to maintain a set of addresses of data received by cache-to-cache transfers; and a second processing node operatively point-to-point connected to the first processing node, where, in response to a cache miss for data requested by the first processing node, the snooping-based cache-coherence controller is arranged to cause a return of the requested data directly from a cache memory of the second processing node dependent on the set of addresses.

According to another aspect of one or more embodiments of the present invention, a method of performing operations in a network of point-to-point connected processing nodes comprises: requesting data from a cache memory of a first processing node; if the requested data is not found in the cache memory, searching for an address of the requested data in a list of addresses of data transferred by cache-to-cache transfers in the network; if the address of the requested data is found in the list, accordingly returning the requested data directly from another processing node; and if the address of the requested data is not found in the list, broadcasting a request for the requested data across the network of point-to-point connected processing nodes.

According to another aspect of one or more embodiments of the present invention, a modular computer system comprises: a plurality of integrated circuits; and a snooping-based cache-coherence controller operatively connected to the plurality of integrated circuits, the snooping-based cache-coherence controller having a cache memory and capable of maintaining a directory of addresses of data transferred by cache-to-cache transfers, where the modular computer system is point-to-point connectable to other modular computer systems, and where, in response to a local cache miss for data requested by the modular computer system, the modular computer system is configured to search the directory for an address of the requested data.

According to another aspect of one or more embodiments of the present invention, a computer network comprises a cluster of individual SMP computer systems that are connected using point-to-point interconnect, at least one of the individual SMP computer systems having a snooping-based cache-coherence controller and a directory of addresses of data transferred by cache-to-cache transfers in the network, where, in response to a cache miss for requested data in the cache memory of the at least one of the individual SMP computers and dependent on the directory, the snooping-based cache-coherence controller is arranged to one of cause a return of the requested data from a particular one of the individual SMP computer systems and broadcast a request for the requested data across the cluster.

According to another aspect of one or more embodiments of the present invention, a computer system comprises a plurality of integrated circuits, a snooping-based cache-coherence controller connected to the plurality of integrated circuits and having a cache memory and a list of addresses of data transferred by cache-to-cache transfers, and memory comprising instructions to: selectively request data from the cache memory, if the requested data is not found in the cache memory, search the list for an address of the requested data; if the address of the requested data is found in the list, accordingly return the requested data from a location designated by the list; and if the address of the requested data is not found in the list, broadcast a request for the requested data to processing nodes connected to the computer system.

Other aspects and advantages of the invention will be apparent from the following description and the appended claims.

DETAILED DESCRIPTION

In a SMP computer system, such as that shown in FIG. 3, each microprocessor has its own cache memory (see description of cache memories above with reference to FIG. 1). Thus, because a particular cache memory data item acted upon by one microprocessor may cause the copy of that data item to differ from other copies of that data item stored in the cache memories of the various microprocessors in a SMP computer system, "cache-coherency" techniques are implemented to ensure that the local cache memory of each microprocessor is consistent with respect to values that are stored in the cache memories of other microprocessors in the SMP computer system.

Cache-coherence problems arise in SMP computer systems when more than one microprocessor cache memory holds a copy of a data item. One type of cache-coherency technique known and referred to as a "snooping" relies on all cache memories to monitor a common network (e.g., a bus) that connects microprocessors to memory. In other words, a snooping-based cache-coherency technique depends on the ability of cache memories to observe every transaction on a network (e.g., a bus) common to the cache memories.

Figure 4:
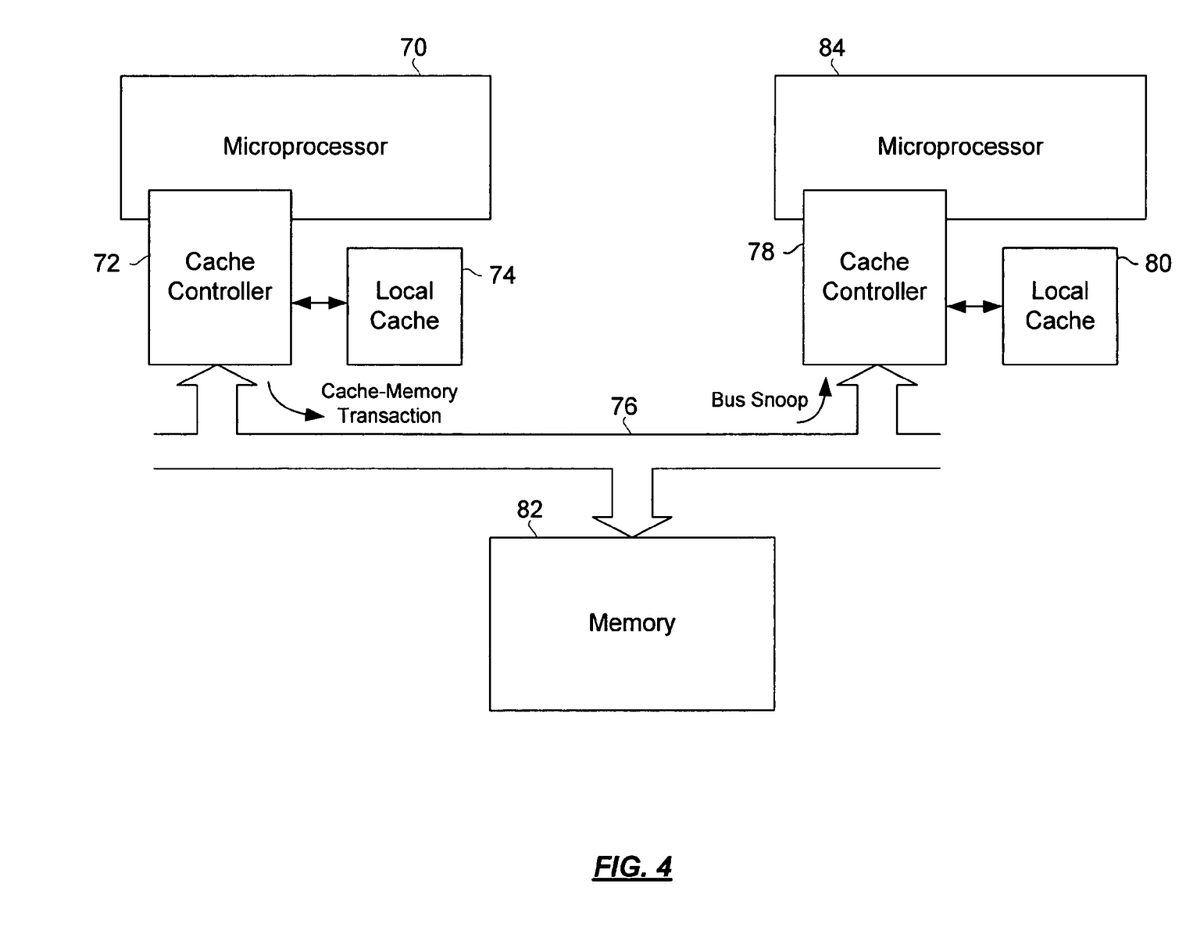
FIG. 4 shows a snooping cache-coherent multiprocessor computer system.

Now referring to FIG. 4, when microprocessor 70 requests data, a cache controller 72 local to microprocessor 70 searches for the requested data in a cache memory 74 local to microprocessor 70. If the requested data is not found in the local cache memory 74, the cache controller 72 broadcasts a data request on a bus 76 connected to other cache controllers (e.g., cache controller 78) (others not shown). The cache controllers (e.g., cache controller 78) "snoop" on the bus 76 to monitor all transactions on the bus 76. If a particular cache memory (e.g., cache memory 80 associated with microprocessor 84) has the data requested by the requesting cache controller 72, the cache controller (e.g., cache controller 78) associated with the cache memory (e.g., cache memory 80) having the requested data forwards (i.e., returns) the requested data to the requesting cache controller 72, which, in turn, updates its associated cache memory 74 with the returned requested data and provides the returned requested data to requesting microprocessor 70. Alternatively, if the requested data is not held in any of the cache memories 74, 80, a copy of the requested data in the main memory 82 is returned to and used by the requesting microprocessor 70.

Further, a cache controller, connected to the bus 76, that observes data being written from one cache memory to another may invalidate or update its own copy of that data. The next time the cache controller's microprocessor requests that data, the most recent value of the data is provided to the microprocessor, either because its local cache memory has the most recent value of the data or through obtaining that data by generating a data request on the bus 76.

Those skilled in the art will recognize that although a snooping-based cache-coherency technique obtains data relatively quickly (i.e., has relatively low latency), such a technique consumes relatively high bandwidth due to the parallel broadcast nature of its requests. As a result, snooping-based cache-coherency techniques are typically limited to small-scale systems.

Figure 5:
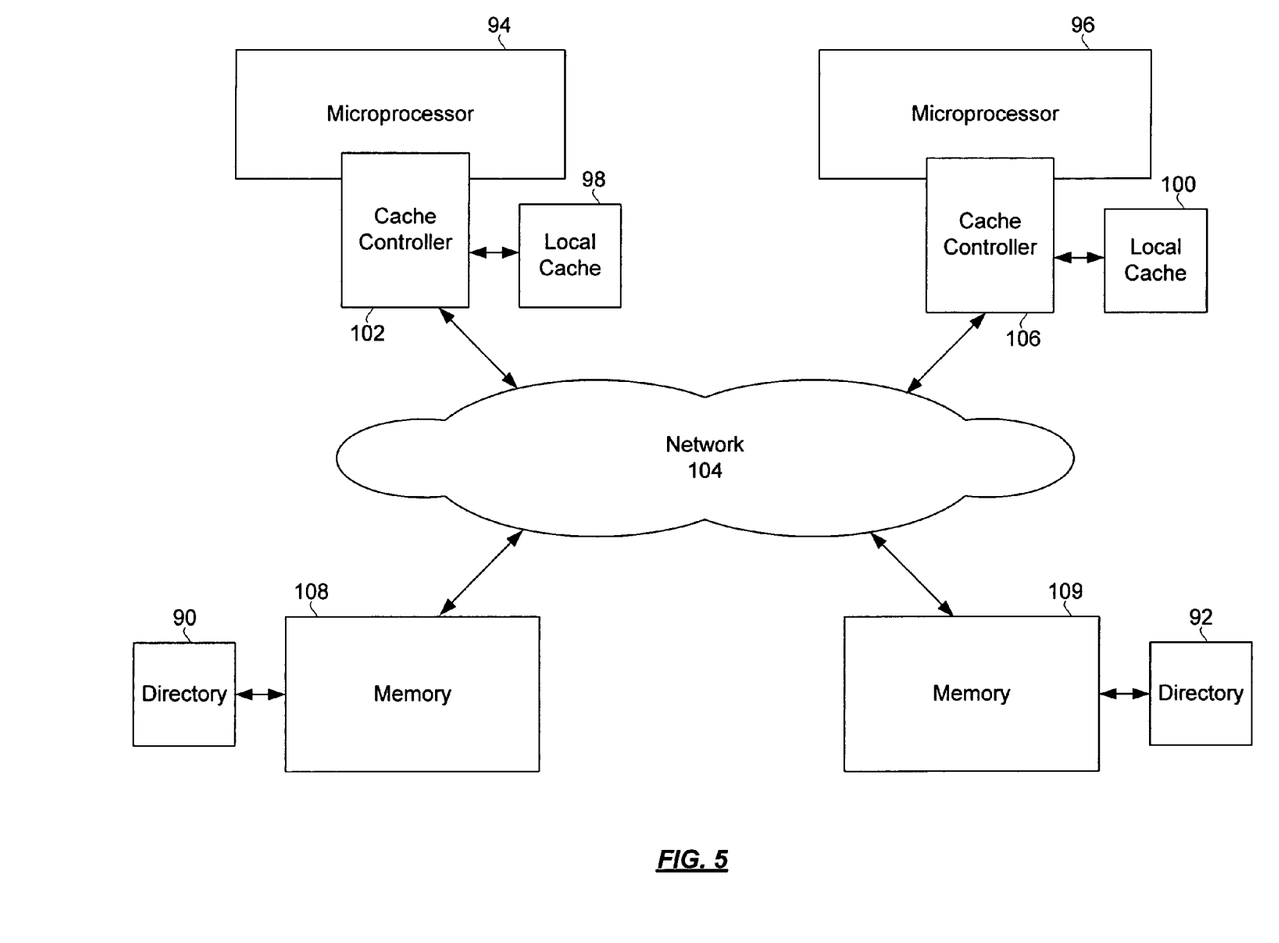
FIG. 5 shows a directory-based cache-coherent multiprocessor computer system.

Now referring to FIG. 5, in another type of cache-coherency technique known and referred to as "directory-based cache-coherence," when a cache miss occurs in a local cache memory (e.g., local cache memory 98 or 100) of a microprocessor (e.g., microprocessor 94 or 96), a cache controller (e.g., cache controller 102 or 106) issues a data request over a network 104 to a "home" directory (e.g., directory 90 or 92) of the requested data, the "home" directory typically being associated with the "home" memory (e.g., memory 108 or 109) of the requested data. The "home" directory may indicate to the cache controller a location of the requested data. Alternatively, if the "home" directory indicates that no other cache memories connected to the network 104 have the requested data, the requested data may be returned by the "home" memory of the requested data.

One advantage of directory-based cache-coherency techniques with respect to snooping-based cache-coherency techniques is that they keep track of which microprocessor nodes have copies of particular data, thereby eliminating the need for a high-bandwidth data request broadcast. This is valuable on read misses because a data request is subsequently satisfied either by the directory indicating the location of a copy of the requested data or by accessing the main memory.

Further, because directory-based cache-coherent techniques may rely on low-bandwidth interconnect rather than on high-bandwidth networks (e.g., buses) that are necessary for broadcasting in snooping-based cache-coherency techniques, directory-based cache-coherent SMP computer systems may be scalable to a large number of microprocessors. However, the indirection overheads associated with directory queries make directory-based cache-coherency techniques slower (i.e., have higher latency) than snooping-based cache-coherency techniques (e.g., a directory-based cache-coherence technique may often require three times the number of "hops" otherwise taken in a snooping-based cache-coherence technique).

For example, in a snooping-based cache-coherency technique, upon a cache miss, one set of parallel messages is broadcast over a bus and one response message with the requested data is sent back to the requesting processing node. On the other hand, in a directory-based cache-coherent technique, upon a cache miss, a data request message is sent to the home processing node, the home processing node forwards the data request message to the owning cache memory, and the owning cache memory returns the requested data to the requesting processing node. Thus, generally, in snooping-based cache-coherency techniques, there are more messages in parallel (relatively low average latency), while in directory-based cache-coherency techniques, there are more messages in series (relatively high average latency).

Often, several small SMP servers (e.g., near-commodity modular shelf servers) are connected together to provide increased processing capabilities. Due to the limited bandwidth of the cables connecting the servers, directory-based cache-coherency techniques are required to ensure cache-coherence among the servers. However, as described above, directory-based cache-coherency techniques have relatively high average latency compared to snooping-based cache-coherency techniques.

In one or more embodiments of the present, a cluster of multiprocessing nodes are connected together and use snooping-based cache-coherence to maintain consistency among cache memories of the multiprocessing nodes. As described further below, such snooping-based cache-coherence is made possible by, perhaps among other things, using high-speed point-to-point interconnect to connect the multiprocessing nodes. Further, embodiments of the present invention relate to a technique for reducing the bandwidth consumed in a snooping-based cache-coherent cluster of microprocessing nodes.

Figure 6:
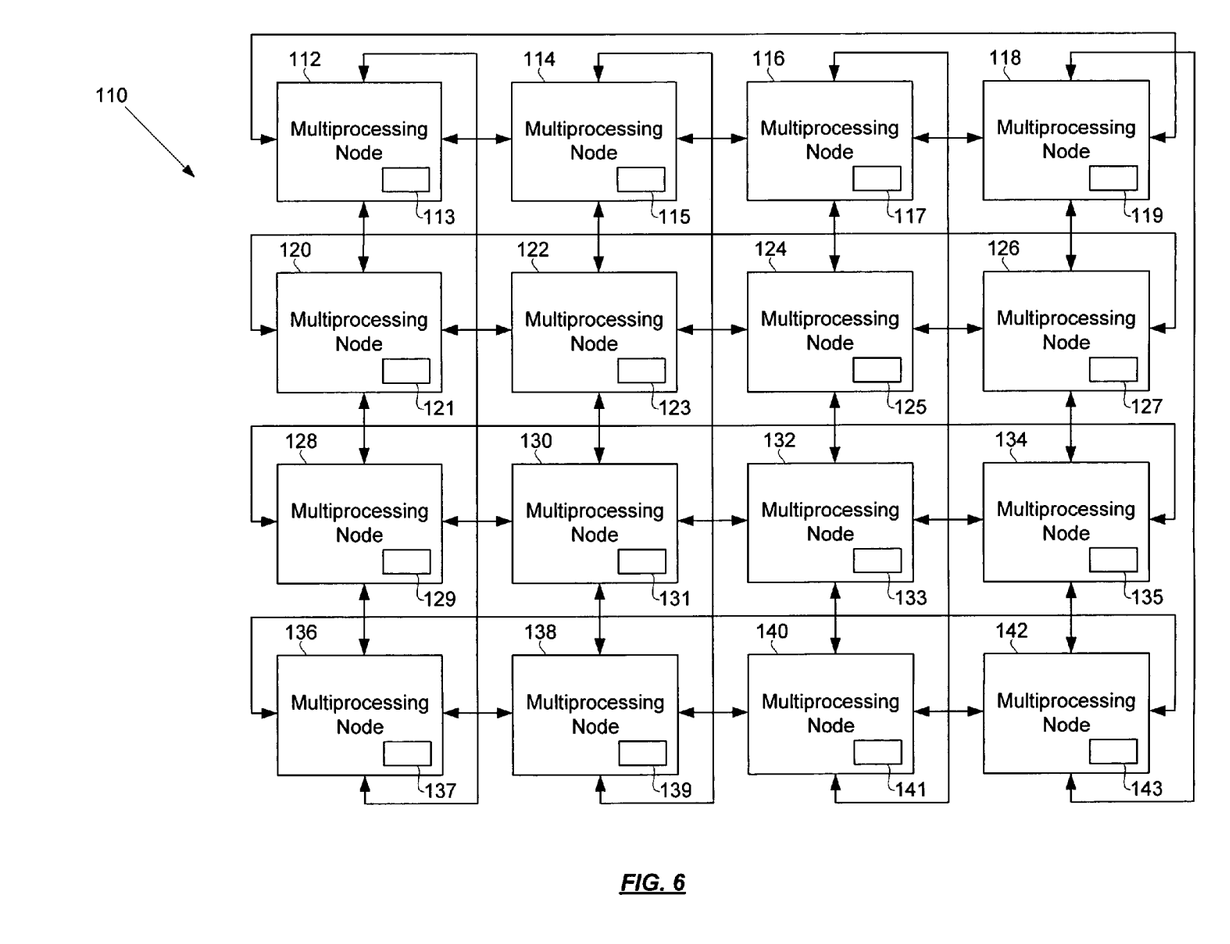
FIG. 6 shows a computer system in accordance with an embodiment of the present invention.

FIG. 6 shows an exemplary computer system 110 in accordance with an embodiment of the present invention. In FIG. 6, a plurality of multiprocessing nodes 112, 114, 116, 118, 120, 122, 124, 126, 128, 130, 132, 134, 136, 138, 140, 142 are point-to-point connected using high-bandwidth interconnect (shown but not labeled). Particularly, each multiprocessing node (also referred to as "processing node") 112, 114, 116, 118, 120, 122, 124, 126, 128, 130, 132, 134, 136, 138, 140, 142 is connected to an adjacent multiprocessing node (in FIG. 6, each peripheral multiprocessing node is shown as being connected to the opposite peripheral multiprocessing node, e.g., multiprocessing node 112 is connected to multiprocessing node 118). In one or more other embodiments of the present invention, a microprocessing node may be connected to a non-adjacent microprocessing node. Further, a processing or multiprocessing node is not limited to a server and may be any type of computer system.

Further, in one or more embodiments of the present invention, high-bandwidth interconnect for point-to-point connecting multiprocessing nodes may be implemented using interconnect technologies such as, for example, Infiniband or PCI Express. Moreover, in one or more other embodiments of the present invention, high-bandwidth interconnect used to point-to-point connect multiprocessing nodes may have a bandwidth greater than that of 16-bit 1 GHz interconnect.

Further, in one or more embodiments of the present invention, point-to-point interconnect may be used in cabling a plurality of servers together. Moreover, in one or more embodiments of the present invention, point-to-point interconnect may be used to connect a plurality of servers to a passive backplane.

Still referring to FIG. 6, each microprocessing node 112, 114, 116, 118, 120, 122, 124, 126, 128, 130, 132, 134, 136, 138, 140, 142 is shown as having an address directory table 113, 115, 117, 119, 121, 123, 125, 127, 129, 131, 133, 135, 137, 139, 141, 143, respectively. An address directory table in accordance with one or more embodiments of the present invention is further described below with reference to FIGS. 7 and 8. Further, in one or more other embodiments of the present invention, instead of all the microprocessing nodes in a network having an address directory table, only some (i.e., less than all) of the microprocessing nodes may have an address directory table.

As described above, embodiments of the present invention use snooping-based cache-coherence. Thus, in FIG. 6, cache-coherence among the high-bandwidth point-to-point connected multiprocessing nodes 112, 114, 116, 118, 120, 122, 124, 126, 128, 130, 132, 134, 136, 138, 140, 142 is achieved using a snooping-based cache-coherency technique. To implement snooping-based cache-coherency, each multiprocessing node 112, 114, 116, 118, 120, 122, 124, 126, 128, 130, 132, 134, 136, 138, 140, 142 has a cache controller (not shown) that is operatively connected by the high-bandwidth interconnect (e.g., shown in FIG. 6) to the cache controllers (not shown) of connected multiprocessing nodes (not shown).

Figure 7:
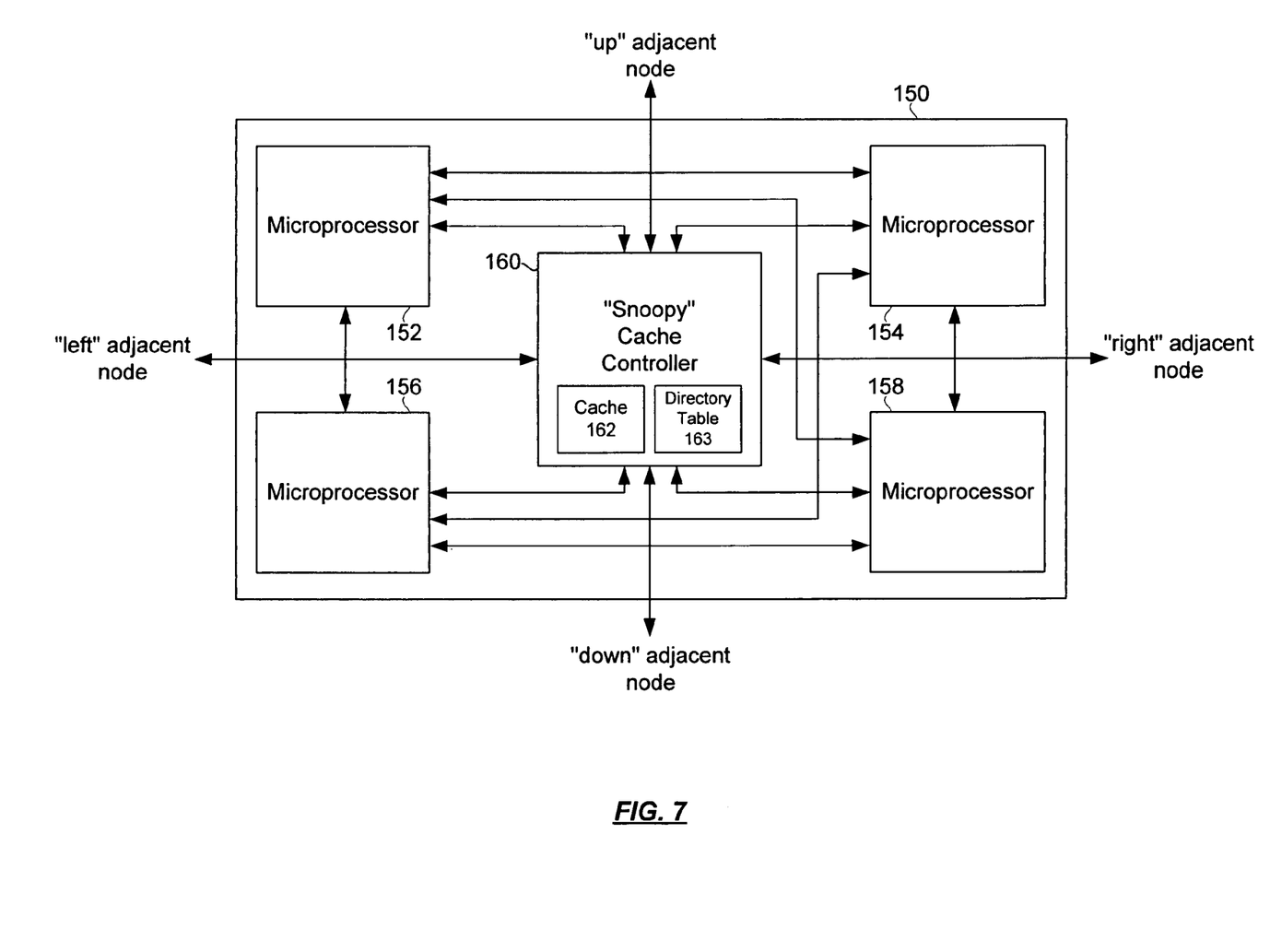
FIG. 7 shows a portion of a computer system in accordance with an embodiment of the present invention.

FIG. 7 shows an exemplary multiprocessing node 150 in accordance with an embodiment of the present invention. In FIG. 7, the multiprocessing node 150 has four microprocessors 152, 154, 156, 158. However, in one or more other embodiments of the present invention, a multiprocessing node may have any number of microprocessors. In FIG. 7, each of the microprocessors 152, 154, 156, 158 is connected to a snooping-based cache-coherence controller 160. The cache-coherence controller (also referred to as "cache controller") 160 is connected over high-bandwidth interconnect to the cache controllers (not shown) of connected multiprocessing nodes (not shown). Further, each microprocessor 152, 154, 156, 158 may be connected to every other microprocessor 152, 154, 156, 158 in the multiprocessing node 150 for, for example, chip-to-chip communication.

Further, although the cache controller 160 in FIG. 7 is shown as being connected to adjacent processing nodes, in one or more other embodiments of the present invention, a cache-coherence controller may be connected to one or more non-adjacent processing nodes.

Still referring to FIG. 7, the cache controller 160 has a cache memory 162 (in addition to the cache memories (not shown) local to the microprocessors 152, 154, 156, 158). In one or more embodiments of the present invention, the cache memory 162 of the cache controller 160 may be sized relatively large (e.g., greater than 32 MB) so as to reduce the frequency of broadcasting data requests to other multiprocessing nodes upon a cache miss in one of its microprocessor's local cache memories. In other words, by sizing cache memory 162 to be relatively large, upon a cache miss in a local microprocessor's local cache memory, the likelihood of the cache controller 160 finding the requested data in the cache memory 162 is increased, thereby reducing the frequency of bandwidth-consuming data request broadcasts to other multiprocessing nodes (not shown). The cache memory 162 may hold copies of data that are frequently and/or recently requested by the local microprocessors 152, 154, 156, 158 of the multiprocessing node 150.

Still referring to FIG. 7, the cache controller 160 also has an address directory table 163. As is further described below with reference to FIG. 8, the address directory table maintains a list of addresses of data last transferred by cache-to-cache transfer transactions. Those skilled in the art will note that a cache-to-cache transfer is a transaction in which, upon a local cache miss, data (or an address thereof) is transferred from a remote cache to the local cache. In other words, a transfer of data (or an address thereof) between cache memories of different processing nodes is a cache-to-cache transfer. Those skilled in the art will note that in some workloads, a considerable percentage of bandwidth consumption may be attributable to cache-to-cache transfers.

Those skilled in the art will note that an address directory table in accordance with one or more embodiments of the present invention may maintain a list of addresses of data last transferred by cache-to-cache transfers throughout a network. In one or more other embodiments of the present invention, an address directory table may maintain a list of addresses of data last transferred by cache-to-cache transfers involving particular cache memories.

Still referring to FIG. 7, when a microprocessor (e.g., microprocessor 152) requests data that is not found in its local cache memories (or memories) (not shown), the cache controller 160 searches cache memory 162 for the requested data, and if the requested data is not found in cache memory 162 (i.e., a local cache miss has occurred), the cache controller 160 may either, depending on the contents of the address directory table 163, (i) perform a snooping-based cache-coherence operation (e.g., broadcast a data request to operatively connected cache controllers (not shown)) or (ii) have the requested data directly returned from a last known location of the requested data.

Figure 8:
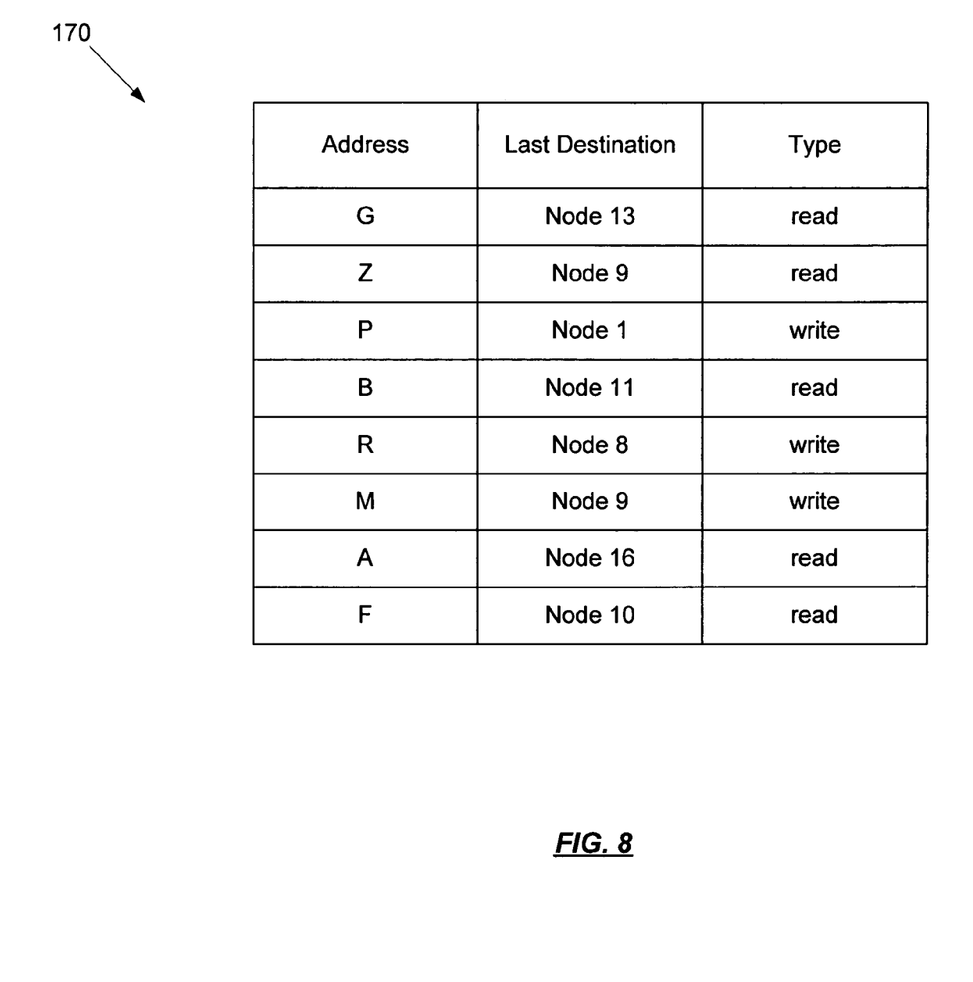
FIG. 8 shows an exemplary representation of a portion of a computer system in accordance with an embodiment of the present invention.

FIG. 8 shows an exemplary address directory table 170 in accordance with an embodiment of the present invention. Generally, the address directory table 170 maintains a list of locations (i.e., addresses) of data last transferred by cache-to-cache transfers. The address directory table 170 includes an Address field (or column) that references a number of addresses of data recently and/or frequently returned using cache-to-cache transfers. For example, if in FIG. 8, the top-most entry in the address directory table 170 represents the data most recently returned from a cache memory of a remote processing node (i.e., a processing node different than that of a cache controller (e.g., 160 in FIG. 7) to which the address directory table 170 is considered "local"), address G is the address of the last data returned to the cache controller by a remote cache memory.

Further, the address directory table 170 includes a Last Destination field (or column) that references the last destination of the data corresponding to the associated Address field entry. For example, in the address directory table 170, the data at address Z was last cache-to-cache transferred to processing node 9. As is further described below with reference to FIGS. 9 and 10, an entry in the Last Destination field may be updated in response to a cache-to-cache transfer that does not involve the processing node associated with the address directory table 170. For example, if (i) the address directory table 170 shown in FIG. 8 is local to processing node 7 and (ii) a cache-to-cache transfer involving data at address M occurs between processing nodes 4 and 9, then, as shown in FIG. 8, the Last Destination field associated with address M is updated (on a "best efforts" basis as described below with reference to FIGS. 9 and 10) to reflect the last destination of the data at address M.

The address directory table 170 may also include a Type field that indicates the type of the cache miss (e.g., read or write) of the last cache-to-cache transfer associated with a particular address. For example, in the address directory table 170, the data at address R was last cache-to-cache transferred to satisfy a read request by processing node 8.

Those skilled in the art will note that the an address directory table in accordance with one or more embodiments of the present invention may be implemented using hardware and/or software and is not limited to a table structure. In other words, the information shown in the address directory table 170 may be maintained by any type of data structure. Further, an address directory table in accordance with one or more embodiments of the present invention may contain less, more, and/or different information than that shown in FIG. 8.

Figure 9:
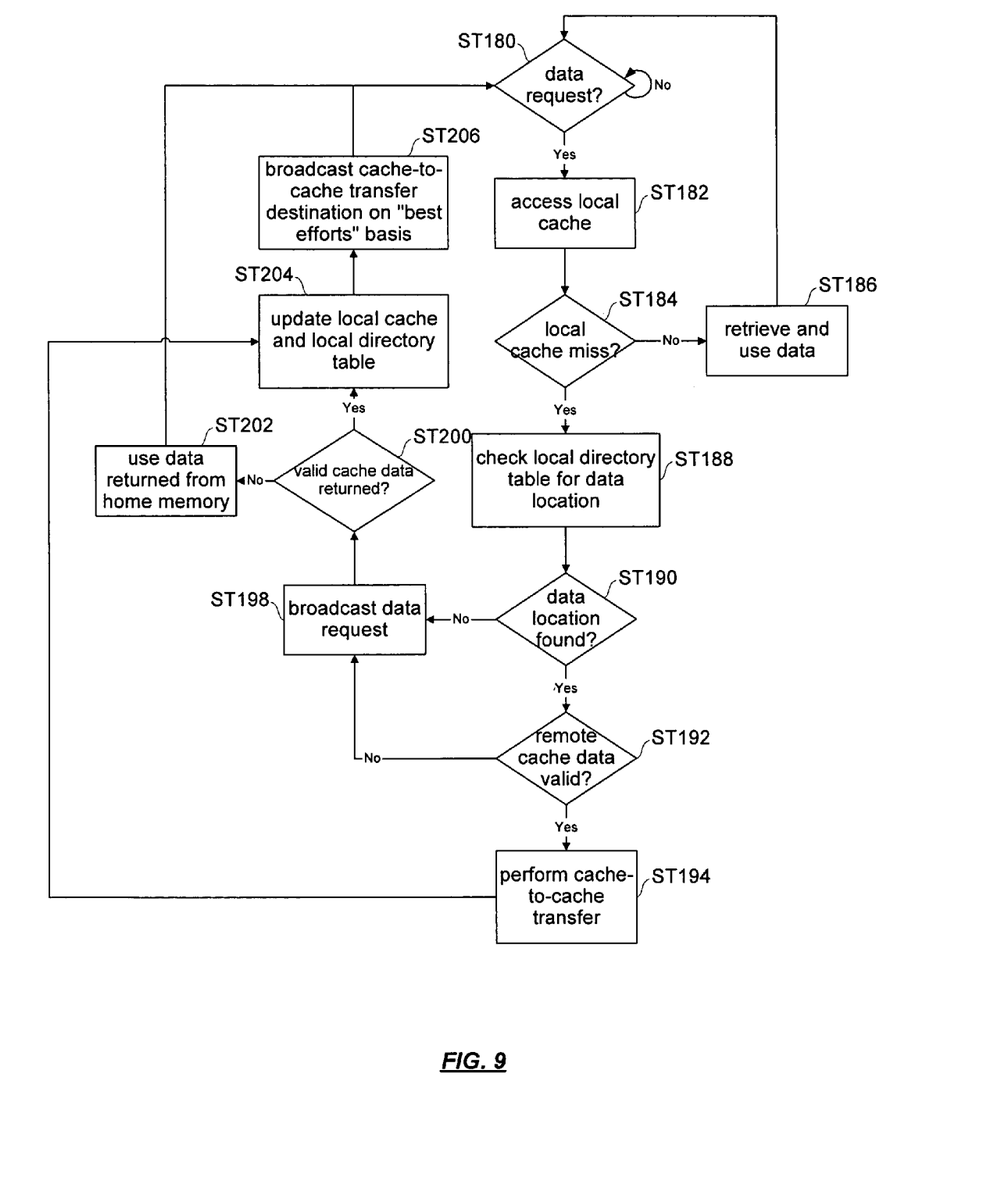
FIG. 9 shows a flow process in accordance with an embodiment of the present invention.

FIG. 9 shows an exemplary flow process in accordance with an embodiment of the present invention. Once a processing node (e.g., a multiprocessing server) requests data ST180, the requesting processing node's local cache memory is accessed and searched for the requested data ST182. If the requested data is in the local cache memory (i.e., a local cache miss has not occurred; instead a local cache hit has occurred) ST184, the found data is retrieved and used by the requesting processing node ST186.

However, if the requested data is not in the local cache memory (i.e., a local cache miss has occurred) ST184, the requesting processing node's address directory table is checked for an address of the requested data ST188. If (i) the address of the requested data is found in the requesting processing node's address directory table ST190 and (ii) a copy of the requested data from the last cache-to-cache transfer destination (the destination being a cache memory "remote" to the requesting processing node) of the requested data as indicated in the address directory table is valid ST192, the requesting processing node causes the copy of the requested data to be returned by a cache-to-cache transfer from the indicated remote cache memory ST194. Upon the return of the requested data by cache-to-cache transfer ST194, the requesting processing node's local cache memory and address directory table are accordingly updated ST204.

If (i) the address of the requested data is not found in the requesting processing node's address directory table ST190 or (ii) the address of the requested data is found in the requesting processing node's address directory table ST190, but the copy of the requested data in the last cache-to-cache transfer destination of the requested data is not valid ST192, the requesting processing node broadcasts a data request to other connected processing nodes ST198 (i.e., the requesting processing node performs a snooping-based cache-coherency operation). If a valid copy of the requested data is returned via cache-to-cache transfer by a remote processing node ST200, the requesting processing node's local cache memory and address directory table are accordingly updated ST204. Alternatively, if (i) a copy of the requested data returned by cache-to-cache transfer in response to the broadcast is not valid or (ii) a copy of the requested data is not cache-to-cache transferred at all, the requesting processing node may use the copy of requested data returned by a home memory (e.g., a main memory having the requested data) of the requested data ST202. Further, in one or more embodiments of the present invention, an address directory table may be used to track a home memory of data having an address listed in the address directory table.

In the event that the requested data is returned to the requesting processing node by a cache-to-cache transfer (e.g., via steps ST198, ST200 or steps ST188, ST190, ST192, ST194), the destination of the cache-to-cache transfer (in this case, the requesting processing node) is broadcast on a "best efforts" basis to other connected processing nodes ST206 to allow those other connected processing nodes to update in their respective address directory tables those last destination entries corresponding to the address of the data returned to the requesting processing node. For example, if a requesting processing node obtains by cache-to-cache transfer data at address B, the subsequent "best efforts" broadcast results in a remote processing node (i.e., a processing node other than the requesting processing node) updating its address directory table to reflect (e.g., by allocating an entry) that the last cache-to-cache transfer destination of the data at address B is the requesting processing node. Those skilled in the art will note that one or more various allocation techniques to update an address directory table may be used.

Figure 10:
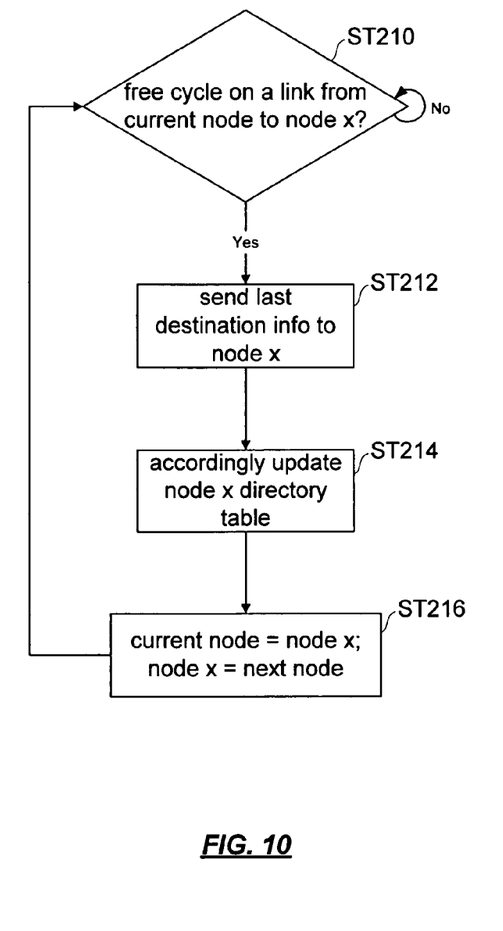
FIG. 10 shows a flow process in accordance with an embodiment of the present invention.

FIG. 10 shows an exemplary flow process in accordance with an embodiments of the present invention. More specifically, FIG. 10 shows an exemplary technique for broadcasting a completed cache-to-cache transfer on a "best efforts" basis. When a "current" processing node obtains data at address a by cache-to-cache transfer, a determination is made as to whether there is, or will be, a free (i.e., unused) cycle on a link (i.e., a connection) from the current processing node to processing node x ST210. If a cycle is, or will be, available, the current processing node sends a message to node x indicating that the current processing node was the last cache-to-cache transfer destination of the data residing at address a ST212. Then, based on the message sent in step ST212, the address directory table of node x is updated ST214. Then, the current processing node is defined to be node x and node x is set to a next node ST216. Thereupon, the flow process shown in FIG. 10 may be repeated.

In such a manner, the broadcast of a completed cache-to-cache transfer may be propagated among connected processing nodes (i.e., relayed from processing node to processing node) using otherwise unused or free cycles, thereby not creating a bandwidth bottleneck otherwise possible if a broadcast of a completed cache-to-cache transfer were to be "forced" out among connected processing nodes. Further, in one or more other embodiments of the present invention, messages indicating a completed cache-to-cache transfer may be set to be of low priority so as not to preempt the passage of higher priority messages. Those skilled in the art will note that a message indicating a completed cache-to-cache transfer may be propagated using any number and any routing of paths among connected processing nodes.

Although FIG. 10 shows a case in which the processing node that is the destination node of a completed cache-to-cache transfer initiates a "best efforts" broadcast of the completed cache-to-cache transfer, in one or more other embodiments of the present invention, a processing node that is the sending node in the completed cache-to-cache transfer may initiate the "best efforts" broadcast.

In one or more embodiments of the present invention, a "best efforts" broadcast of a completed cache-to-cache transfer may be initiated by the processing node that is the destination of the cache-to-cache transfer. In one or more other embodiments of the present invention, a "best efforts" broadcast of a completed cache-to-cache transfer may be initiated by the processing node that is the sender of the cache-to-cache transfer.

Advantages of the present invention may include one or more of the following. In one or more embodiments of the present invention, modular shelf servers may be easily connected together to desirably behave as a snooping-based cache-coherent SMP computer system.

In one or more embodiments of the present invention, because a network of connected multiprocessing nodes uses a snooping-based cache-coherency technique to ensure cache-coherence among the servers, average latency, upon a local cache miss, may be reduced relative to the latency present with cable-connected multiprocessing nodes having directory-based cache-coherence.

In one or more embodiments of the present invention, a processing node in a snooping-based cache-coherent cluster or processing nodes maintains an address directory table of destinations of data last transferred to the processing node by cache-to-cache transfers. Thus, upon a local cache miss, the processing node may cause a copy of the requested data to be directly returned from the last known destination of the requested data, thereby reducing bandwidth consumption otherwise needed to broadcast a cluster-wide data request.

In one or more embodiments of the present invention, bandwidth consumption may be reduced in a snooping-based cache-coherent cluster of multiprocessing nodes by broadcasting completed cache-to-cache transfers on a "best efforts" basis.

In one or more embodiments of the present invention, because a cache controller for each multiprocessing server in a network of multiprocessing servers has a relatively large cache memory, the frequency of network-wide data request broadcasts may be reduced.

In one or more embodiments of the present invention, because a SMP server may easily be removed or added from a network of point-to-point connected multiprocessing servers using snooping-based cache-coherence, the network of point-to-point connected multiprocessing servers may offer improved scalability and/or modularity.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of performing operations in a network of point-to-point connected processing nodes, comprising:
   requesting data from a cache memory of a first processing node;
   if the requested data is not found in the cache memory, searching for an address of the requested data in a list of addresses of data transferred by cache-to-cache transfers in the network;
   if the address of the requested data is found in the list, accordingly returning the requested data directly from another processing node; and if the address of the requested data is not found in the list, broadcasting a request for the requested data across the network of point-to-point connected processing nodes.

2. The method of claim 1, wherein at least one of the processing nodes is a SMP system.

3. The method of claim 1, further comprising:
if at least one of the requested data is directly returned from the another processing node and the requested data is returned in response to the broadcasting, issuing a message indicating a completion of a data transfer to the first processing node.

4. The method of claim 3, further comprising:
determining a presence of an unused cycle on a link between one processing node and another processing node; and
if there is an unused cycle on the link, using the unused cycle to propagate at least part of the message from the one processing node to the another processing node.

5. The method of claim 3, further comprising:
selectively propagating the message on a link from one processing node to another processing node if there are no messages of higher priority requesting to be propagated on the link.

6. The method of claim 1, further comprising:
if the requested data is not returned by a cache-to-cache transfer in response to the broadcasting, using a copy of the requested data returned from a main memory.

7. A modular computer system, comprising:
a plurality of integrated circuits; and
a snooping-based cache-coherence controller operatively connected to the plurality of integrated circuits, the snooping-based cache-coherence controller having a cache memory and capable of maintaining a directory of addresses of data transferred by cache-to-cache transfers,
wherein the modular computer system is point-to-point connectable to other modular computer systems, and
wherein, in response to a local cache miss for data requested by the modular computer system, the computer system is configured to search the directory for an address of the requested data.

8. The modular computer system of claim 7, wherein the modular computer system is a SMP system.

9. The modular computer system of claim 7, wherein, in response to a return of the requested data by a cache-to-cache transfer, the modular computer system is configured to issue a message indicating a completion of a data transfer to the modular computer system.

10. The modular computer system of claim 9, wherein the modular computer system is configured to transmit the message to another modular computer system using an otherwise unused cycle on a link between the modular computer system and the another modular computer system.

11. A computer system, comprising:
a plurality of integrated circuits;
a snooping-based cache-coherence controller connected to the plurality of integrated circuits and having a cache memory and a list of addresses of data transferred by cache-to-cache transfers; and
memory comprising instructions to:
selectively request data from the cache memory,
if the requested data is not found in the cache memory, search the list for an address of the requested data,
if the address of the requested data is found in the list, accordingly return the requested data from a location designated by the list, and
if the address of the requested data is not found in the list, broadcast a request for the requested data to computer systems connected to the computer system.

12. The computer system of claim 11, the memory further comprising instructions to:
if at least one of the requested data is returned from the designated location and the requested data is returned in response to the broadcast, issue a message indicating a completion of a data transfer to the computer system.

13. The computer system of claim 12, the memory further comprising instructions to:
determine a presence of an unused cycle on a link between the computer system node and another computer system; and
if there is an unused cycle on the link, use the unused cycle to propagate at least part of the message from the computer system to the another computer system.

14. The computer system of claim 12, the memory further comprising instructions to:
propagate the message on a link between the computer system and another computer system if there are no messages of higher priority requesting to be propagated on the link.

15. The computer system of claim 11, the memory further comprising instructions to:
if the requested data is not returned in response to the broadcast, use a copy of the requested data returned from a main memory.

* * * * *